J. J. SCHRAMM.
COLLAPSIBLE SEAT FOR VEHICLES.
APPLICATION FILED MAY 8, 1916.

1,218,006.

Patented Mar. 6, 1917.
2 SHEETS—SHEET 1.

WITNESSES:
Harry A. Beimer
Else M. Siegel

INVENTOR.
Joseph J. Schramm
BY
ATTORNEY.

J. J. SCHRAMM.
COLLAPSIBLE SEAT FOR VEHICLES.
APPLICATION FILED MAY 8, 1916.
1,218,006.
Patented Mar. 6, 1917.
2 SHEETS—SHEET 2.
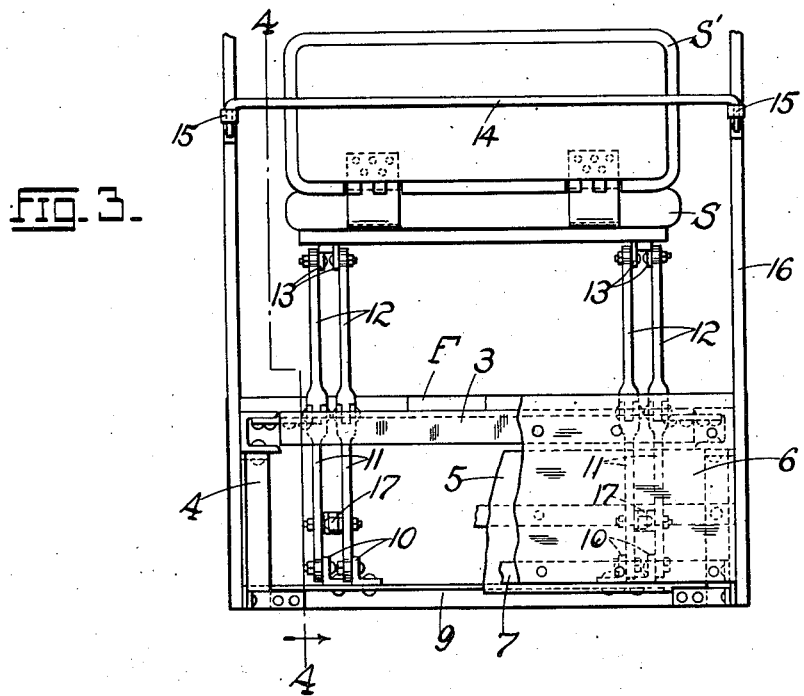
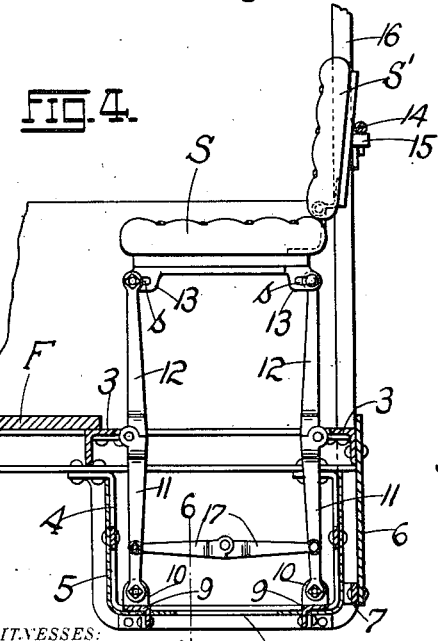
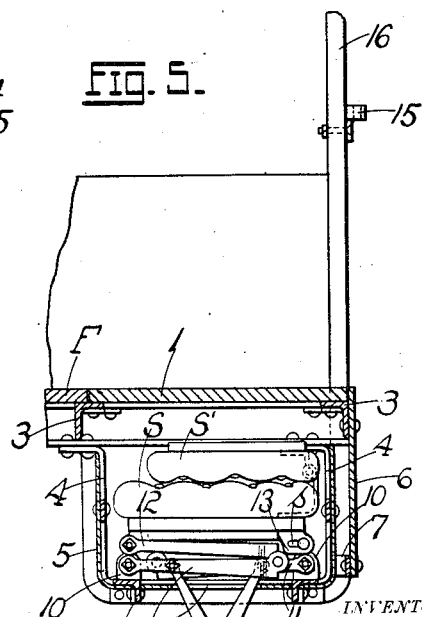
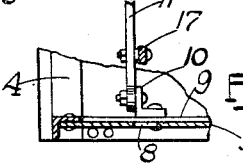
WITNESSES:
INVENTOR.
Joseph J. Schramm
BY
ATTORNEY.

UNITED STATES PATENT OFFICE.

JOSEPH J. SCHRAMM, OF ST. LOUIS, MISSOURI, ASSIGNOR OF ONE-HALF TO HERMAN KROEMER, OF ST. LOUIS, MISSOURI.

COLLAPSIBLE SEAT FOR VEHICLES.

1,218,006.  Specification of Letters Patent.  Patented Mar. 6, 1917.

Application filed May 8, 1916. Serial No. 96,202.

*To all whom it may concern:*

Be it known that I, JOSEPH J. SCHRAMM, a citizen of the United States, residing at St. Louis, State of Missouri, have invented certain new and useful Improvements in Collapsible Seats for Vehicles, of which the following is a full, clear, and exact description, reference being had to the accompanying drawings, forming a part hereof.

My invention has relation to improvements in collapsible vehicle-seats; and it consists in the novel features of construction more fully set forth in the specification and pointed out in the claim.

The object of my invention is to provide a collapsible seat for automobile delivery vehicles whereby such vehicle may be converted into a passenger car by reason of the seating accommodation afforded by such seat when unfolded into service position. A further object is to make suitable provision for housing the seat when collapsed without departing from the prevailing conventional design of vehicles of that class. A further object is to attain the purposes here sought by a simple construction of seat which will be strong, durable and comfortable. The advantages of the invention will be fully apparent from the following detailed description in connection with the accompanying drawings in which—

Figure 1:
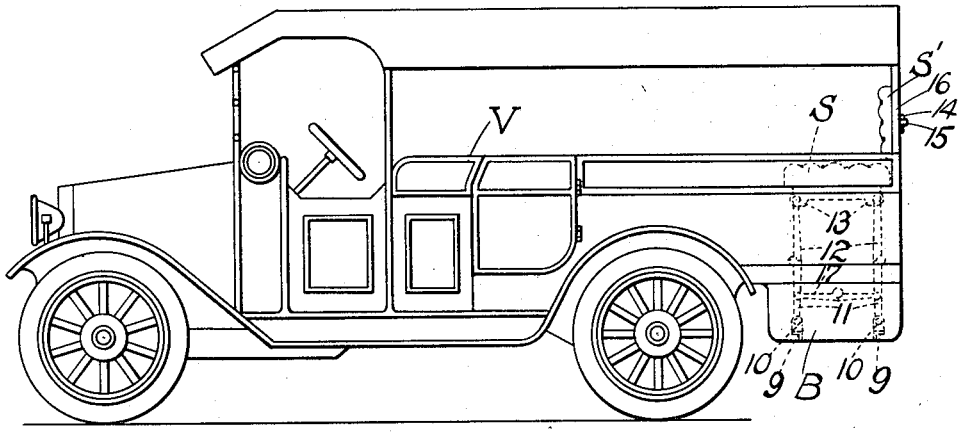
Figure 2:
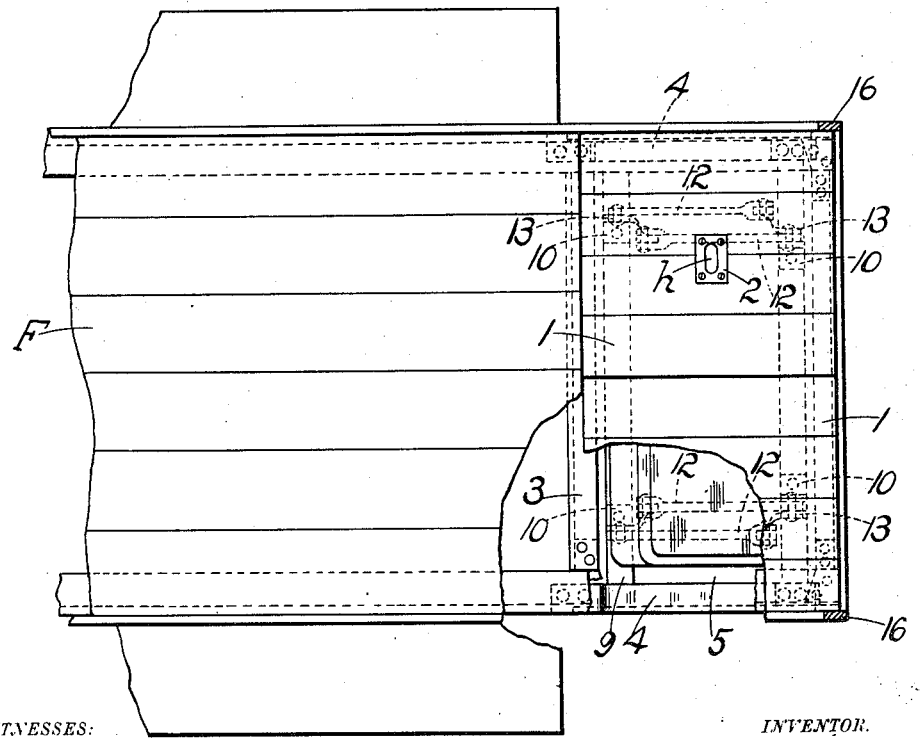

Figure 1 represents a side elevation of a conventional automobile delivery wagon showing my invention applied thereto; Fig. 2 is a top plan of the rear portion of the wagon body with parts broken away, showing the seat in folded or collapsed position; Fig. 3 is a rear view of the vehicle with seat unfolded or in service position; Fig. 4 is a vertical longitudinal section on the line 4—4 of Fig. 3 with seat in elevation; Fig. 5 is a similar sectional view with seat however in collapsed position; and Fig. 6 is a vertical sectional detail on the line 6—6 of Fig. 4.

Referring to the drawings, V, represents the body of the wagon and B, a rear pit, housing, or equivalent receptacle or casing depressed below the plane of the floor F of the wagon, the object of the receptacle being to house the seat when the latter is collapsed. When the seat has been folded into the housing the top opening of the housing is closed or covered by a platform preferably composed of two sections 1, 1, each section being composed of planks or boards and provided with a hand-hole *h* protected by a plate 2 whereby the section can be handled, as well understood in the art. The platform 1 rests on a suitable angle frame 3 which surrounds the opening of the casing although any suitable frame may be built for the purpose depending on the wishes of the designer or builder. To the frame 3 are riveted the structural members or bars 4, 4, to which in turn is secured the sheet metal covering 5 forming the casing or housing, the rear of which is protected by a plate 6 riveted to the angle frame 3 and to the bottom cross-bar 7 in turn secured to the members 4. The casing or boxing is herein shown more or less conventionally the details of its construction coming well within the purview of the skilled mechanic and not claimed. The bottom of the casing is provided with transverse slots or openings 8 for a purpose to presently appear.

Secured to the bottom angles 9, which enter into the general construction of the frame-work of the boxing or seat-housing, are lugs 10, 10, disposed out of transverse alinement on each side of the transverse axis of the housing, and on opposite sides of the longitudinal axis, each lug having pivotally secured thereto the lower end of a vertically oscillating toggle link or lever 11, the upper end of each lever 11 being pivotally coupled to the adjacent end of a complementary toggle link or lever 12 as shown. The outer terminals of the levers 12 are coupled to the slotted corner fittings 13 of the seat S, the slots *s* permitting the necessary play for the levers 12 with the folding and unfolding of the links. To the rear of the seat S is hinged a back S' which when swung back is supported against a cross-bar 14 whose bent terminals are inserted into the loops 15 carried by the vertical side members or standards 16 of the wagon body. The links 11, 11, on opposite sides of the longitudinal axis of the housing are connected by the downwardly folding toggle links 17, so that when the several links are collapsed, the folded links 17, 17, are free to pass through the slots 8 in the bottom of the housing.

The operation of the device is clear from Figs. 4 and 5. When the several links are unfolded, the members 17, 17, brace the pairs of members 11, 11, against collapse thereby preventing the outer members 12, 12, from folding, the seat S being raised to service position with the unfolding of the several links. In that position the back S' is swung against the bar 14 and the seat is ready for service.

By "breaking" the toggles 17 or folding them through the slots 8, 8, the remaining links will collapse and assume the position shown in Fig. 5, the seat S folding on top of the links 12, and the back S' being folded against the seat S. The depth of the casing or seat housing is such as to receive the folded parts after which the parts are protected by the platform 1 which then forms a continuation of the floor F of the car.

I may of course depart considerably from the details shown without affecting the nature or spirit of my invention. Features shown but not alluded to are well understood in the art and require no description in the present connection.

Having described my invention what I claim is:

In combination with a wagon body provided with a rear receptacle depressed below the plane of the floor of the wagon, said receptacle having its longitudinal axis disposed across the width of the wagon, toggle-links disposed on opposite sides of the respective axes of the receptacle and out of alinement transversely of the receptacle whereby fouling of the links is prevented in folding the same against the bottom of the receptacle, brace toggles connecting said toggle-links and foldable outwardly and downwardly through the bottom of the receptacle with a folding or collapse of the links aforesaid, complementary links coupled to the first mentioned links, a seat pivotally connected to the outer ends of the complementary links, a back hinged to said seat, and a transverse member for the support of the back when the parts are unfolded, the several parts being foldable into the receptacle as set forth.

In testimony whereof I affix my signature, in presence of two witnesses.

JOSEPH J. SCHRAMM.

Witnesses:
 EMIL STAREK,
 ELSE M. SIEGEL.